United States Patent [19]

Cooper et al.

[11] Patent Number: 5,030,358

[45] Date of Patent: Jul. 9, 1991

[54] DEACTIVATION OF PHOSPHONIUM BIOCIDES

[75] Inventors: Kenneth G. Cooper, West Midlands; Robert E. Talbot, Cannock; Keith P. Davis, Kinver; Mark A. Saunders, West Midlands, all of England

[73] Assignee: Albright & Wilson Limited, West Midlands, England

[21] Appl. No.: 508,113

[22] Filed: Apr. 11, 1990

[30] Foreign Application Priority Data

Apr. 14, 1989 [GB] United Kingdom ............... 8908435

[51] Int. Cl.$^5$ ..................... B01D 15/00; C02F 1/28

[52] U.S. Cl. .................... 210/670; 210/694; 210/763

[58] Field of Search ............ 210/670, 694, 763

[56] References Cited

U.S. PATENT DOCUMENTS 3,977,966  8/1976  Pradt et al. .................. 210/694
4,505,823  3/1985  Klein ........................... 210/694

Primary Examiner—Ivars Cintins
Attorney, Agent, or Firm—Frishauf, Holtz, Goodman & Woodward

[57] ABSTRACT

Solutions of organophosphorus biocides which also contain dissolved oxygen are deactivated by adding a catalytic amount of activated carbon.

20 Claims, No Drawings

DEACTIVATION OF PHOSPHONIUM BIOCIDES

BACKGROUND OF THE INVENTION

1. Field of the Invention

This invention concerns a process for the deactivation of certain biocides which are used for the treatment of water.

2. Background Information

In our patent GB 2145708 we have described the use of certain hydroxy alkyl phosphines and phosphonium salts as biocidal agents against bacteria, algae, fungi and other lower organisms. These compounds may be used in cooling and other systems which contain water for prolonged periods, and may prevent the build-up of living organisms which would otherwise reduce the efficiency of such systems. As outlined in EP 0293152, these compounds can also be applied for the purposes outlined above to ecologically sensitive systems containing higher life-forms such as fish, without causing them any harm. An advantage of the compounds is that they achieve a rapid kill of the target organism whilst having a relatively low toxicity to higher organisms such as fish.

However, in systems in which treated water is discharged as effluent it would be advantageous to deactivate these biocides prior to discharge. It is known that certain hydroxy alkyl phosphines and phosphonium salts react with dissolved oxygen and are thereby deactivated in acidic water. This property is not directly applicable to water systems, such as cooling systems, which are often operated at a higher pH e.g. 7 to 10. In this pH range the oxidative decomposition of the biocides essentially does not proceed. It is possible to acidify the effluent before discharge, and allow the oxidation to occur but subsequent adjustment to a neutral pH would be required before discharge. This process would be cumbersome, require continuous tight control and would be costly in terms of acid and alkali consumption. In addition the dissolved solids level in the discharged water would be increased.

SUMMARY OF THE INVENTION

The present invention provides a method of deactivating a solution comprising an organophosphorus biocide of formula $$(R^1R^2R^3R^4P^-)_y X$$

or $$R^1R^2R^3P$$

wherein $R^1$, $R^2$, $R^3$ and $R^4$ each independently represent a $C_{1-24}$ hydroxyalkyl, alkyl or alkenyl group, provided that at least one hydroxyalkyl group is present, and X is an anion of valency y, and dissolved oxygen, which comprises contacting with a catalytic amount of activated carbon. The activated carbon is preferably in the powdered or granular form, typically >80% of less than 200 US mesh (0.075 mm) in size. The term "activated carbon" usually covers carbons having a specific surface area of from 300–2500 $m^2/g$, typically 500–1500 $m^2/g$.

DETAILED DESCRIPTION OF THE INVENTION

The biocides to which this invention is applied preferably contain no more than one alkyl or alkenyl group (i.e. preferably at least 2 or 3 hydroxy alkyl groups).

The hydroxyalkyl groups are preferably 1-hydroxyalkyl and are most preferably hydroxymethyl groups.

If any of $R^1$, $R^2$, $R^3$ and $R^4$ in the above formula are not hydroxyalkyl they are preferably $C_{1-3}$ alkyl or alkenyl (e.g. methyl, ethyl or allyl). Particularly preferred are tetrakis (hydroxymethyl) phosphonium, methyltris(hydroxymethyl) phosphonium, ethyl tris(hydroxymethyl) phosphonium and allyl tris (hydroxymethyl) phosphonium salts. Compounds of this type have been described in EP 0139404 and EP 066544.

In addition to deactivating the biocide this process provides a mechanism for the reduction of the oxygen content of aqueous systems, and can also be used to provide an anaerobic solution, which has considerable application in that it reduces the corrosive action of the said solution. It also provides a mechanism for the reduction of the odour of such systems.

The anion X may be a monovalent anion such as chloride or bromide, or an organic carboxylate, e.g. an alkane carboxylate, preferably of 2–5 carbon atoms such as acetate, bisulphite, bisulphate, an organic sulphonate, such as methanesulphonate or a benzene, toluene or xylene sulphonate, or dihydrogen phosphate; a divalent anion such as sulphate, sulphite, monohydrogen phosphate, a phosphonate or an organic dicarboxylate; a trivalent anion such as phosphate, or an organic carboxylate with 3 carboxyl groups, such as citrate; or a polyvalent anion such as polyacrylate or polymaleate.

Typical catalytic or deodorising amounts of activated carbon are those which provide a weight ratio of carbon: THP in the range 200:1 to 1:500, more preferably 20:1 to 1:50.

The catalyst may additionally contain co-catalysts, promoters or additives designed to assist in this process or others. Additives, such as scale or corrosion inhibitors, flocculants, dispersants, antifoams, oxygen scavengers, biocides, demulsifiers, reverse demulsifiers or lubricants may also be added to the solution which contains the phosphorus biocides. In either case the added material may be solid, liquid or gaseous in nature and may be added periodically or continuously.

The process may be carried out in batch or continuous mode preferably with a contact time of 2 minutes to 30 hours, especially 40 to 200 minutes. Batch mode involves simple addition of the catalyst to the solution and its separation, for example by filtration, after deactivation has taken place. Operation in continuous mode may, for example, involve passing the solution through a bed containing the catalyst.

The catalyst or catalyst mixture may require reactivation or replacement. Any reactivation procedure, which can be chemical or physical in nature (for example steaming), may be conducted in-situ or after removal of the spent catalyst from its operational environment, and can also involve the replacement of the additives etc. This reactivation can be periodic or continuous, and may alternatively or additionally involve treatment of the phase containing the aforementioned phosphorus compounds.

Reactivation may also involve additional physical or mechanical treatment of the catalyst and/or the phase containing the aforementioned phosphorus compound.

and this may be continuously or periodically applied, using a rotating degradation chamber for example.

Solutions of the aforementioned biocides have a characteristic phosphine-like odour. Addition of the catalyst to such solutions reduces this odour even in the absence of dissolved oxygen or another suitable oxidant. Accordingly, this method also provides a mechanism for the deodorization of the aforementioned biocidal solutions, thus improving the applicability of the biocides and further facilitating discharge of treated water to the environment.

This invention provides a catalytic process for the destruction of organophosphorus biocides when in solution, thus improving the environmental characteristics of discharges containing them. It also has the advantage that it reduces the odour of such solutions, and can be adopted for use in aerobic and anaerobic systems. It may have application in industrial processes in general, but especially in the paper industry, the beneficiation of ores, the paint and ink industry, the processing of wood, the electronics industry, mining, quarrying, cooling systems, oil production, extraction, processing and exploration, metal finishing processes and any other process which involves water.

The invention is illustrated in the following Examples:

EXAMPLE 1

To a liter of aqueous (pH=8.5±0.1) deoxygenated tetrakis(hydroxymethyl) phosphonium sulphate (THPS) (500 ppm) solution, was added 1000 ppm of activated carbon. The solution was sealed from the atmosphere and analyses taken over the next 3½ hours indicated only a slight initial drop in the concentration of THPS due, presumably, to adsorption onto the carbon. After 3½ hours the solution was aerated and the concentration of THPS was seen to rapidly diminish as established by titration with iodine solution. After 20 hours the titration indicated that all of the THPS had been destroyed within experimental error. The data for this experiment is shown in Table 1.

TABLE 1

| TIME/MINUTES | CONCENTRATION THPS/PPM |
|---|---|
| 0 | 473.7 |
| 30 | 441.2 |
| 60 | 415.5 |
| 120 | 400.6 |
| 150 | 400.6 |
| 180 | 403.3 |
| 210 | 403.3 |
| SOLUTION AERATED | |
| 240 | 343.8 |
| 270 | 273.4 |
| 300 | 211.2 |
| 330 | 159.7 |
| 1330 | 0 |

EXAMPLE 2

An analogous experiment was performed using the carbon recovered from the first experiment by filtration. Extremely similar results were observed indicating that the activity of the carbon does not diminish over a short period of time. The results are included in the Table 2.

TABLE 2

| TIME/MINUTES | CONCENTRATION THPS/PPM |
|---|---|
| 0 | 468 |
| 30 | 415 |
| 60 | 400 |
| 90 | 397.9 |
| 120 | 392.5 |
| 150 | 392.5 |
| 240 | 392.5 |
| SOLUTION AERATED | |
| 270 | 286.9 |
| 300 | 227.4 |
| 330 | 159.7 |

EXAMPLE 3-11

By proceeding as in Example 1, except that aeration was commenced at time zero and the solution was maintained at pH 8.5 throughout, the following results were obtained.

EXAMPLE 3

Thomas Ness Grade CC1236A (granular)

| Time/min | THPS/ppm |
|---|---|
| 0 | 492.5 |
| 30 | 487.1 |
| 69 | 381.5 |
| 90 | 368.0 |
| 120 | 354.5 |
| 150 | 330.1 |
| 180 | 313.9 |
| 210 | 289.5 |

EXAMPLE 4

Norit A20 (powder)

| Time/min | THPS/ppm |
|---|---|
| 0 | 468.1 |
| 35 | 40.6 |
| 65 | 18.9 |
| 100 | 2.7 |
| 150 | 0 |

EXAMPLE 5

Norit A2401 (granular)

| Time/min | THPS/ppm |
|---|---|
| 0 | 457.3 |
| 15 | 389.7 |
| 30 | 351.8 |
| 45 | 297.7 |
| 60 | 262.5 |
| 90 | 200.2 |
| 120 | 97.4 |
| 150 | 62.2 |
| 180 | 46.0 |
| 210 | 27.1 |

EXAMPLE 6

Norit NC17483 (granular)

| Time/min | THPS/ppm |
|---|---|
| 0 | 460.0 |
| 30 | 278.7 |
| 60 | 167.8 |

-continued

| Time/min | THPS/ppm |
|---|---|
| 90 | 73.1 |
| 150 | 13.5 |
| 180 | 2.7 |

EXAMPLE 7

Sutcliffe Speakman 205CP (powder)

(Specific surface area 900–1000 m$^2$/g)

| Time/min | THPS/ppm |
|---|---|
| 0 | 465.4 |
| 15 | 186.7 |
| 30 | 100.1 |
| 60 | 35.2 |
| 120 | 0 |

EXAMPLE 8

Sutcliffe Speakman 207C (granular)

(Specific surface area 1100–1200 m$^2$/g)

| Time/min | THPS/ppm |
|---|---|
| 0 | 457.3 |
| 30 | 397.8 |
| 60 | 354.5 |
| 90 | 308.5 |
| 120 | 267.9 |
| 180 | 227.3 |
| 210 | 205.7 |

EXAMPLE 9

Sutcliffe Speakman 207A (granular)

(Specific surface area 1000–1150 m$^2$/g)

| Time/min | THPS/ppm |
|---|---|
| 0 | 462.7 |
| 30 | 373.4 |
| 60 | 305.8 |
| 90 | 257.1 |
| 120 | 192.1 |
| 180 | 100.1 |
| 210 | 73.1 |

EXAMPLE 10

Sutcliffe Speakman 207CP (powder)

(Specific surface area 1100–1200 m$^2$/g)

| Time/min | THPS/ppm |
|---|---|
| 0 | 473.6 |
| 35 | 40.6 |
| 45 | 2.7 |
| 60 | 0 |

EXAMPLE 11

Chemviron SC11 (granular)

| Time/min | THPS/ppm |
|---|---|
| 0 | 457.3 |

-continued

| Time/min | THPS/ppm |
|---|---|
| 30 | 405.9 |
| 60 | 349.1 |
| 95 | 305.8 |
| 130 | 265.2 |
| 150 | 251.7 |
| 185 | 200.2 |
| 210 | 173.2 |

Analysis of the solutions upon completion of each of these experiments indicated that no more than 20% of the original phosphorus was retained by any of the catalysts.

In each case a significant reduction in odour of the solution was noted upon addition of the various carbons.

EXAMPLE 12-15

By proceeding as in Example 3, the following results were obtained:

EXAMPLE 12

Norit C gran

| Time/min | THPS/ppm |
|---|---|
| 0 | 465.4 |
| 30 | 251.6 |
| 60 | 89.3 |
| 95 | 21.6 |
| 120 | 0 |

EXAMPLE 13

Norit PK 0.25-1 (granular)

| Time/min | THPS/ppm |
|---|---|
| 0 | 451.9 |
| 60 | 186.7 |
| 90 | 105.5 |
| 120 | 5.4 |

EXAMPLE 14

Norit Elorit (granular)

(Specific surface area approx. 700 m$^2$/g)

| Time/min | THPS/ppm |
|---|---|
| 0 | 458.7 |
| 30 | 165.1 |
| 60 | 48.7 |
| 90 | 8.12 |

EXAMPLE 15

Sutcliffe Speakman 205C (granular)

(Specific surface area 900–1000 m$^2$/g)

| Time/min | THPS/ppm |
|---|---|
| 0 | 449.2 |
| 30 | 378.8 |
| 60 | 320.7 |
| 90 | 273.3 |
| 120 | 235.4 |

-continued

| Time/min | THPS/ppm |
|---|---|
| 150 | 193.5 |

Analyses indicated that absorptions by catalysts were not greater than 16.5%.

Odour reduction was again noted in each instance.

COMPARATIVE EXAMPLE

Blank experiments carried out in the same manner as in Example 3, but without the addition of catalyst or using Siporax sintered glass rings, showed no significant losses of THPS after 210 and 90 minutes respectively. In addition the sintered glass did not absorb a measurable amount of THPS.

EXAMPLE 16

Solutions were made up in deionised water as follows:
(a) Sodium bicarbonate was dissolved to give a level, in solution, of 15,000 ppm. 75% THPS solution was added to this solution to give a level of 5,000 ppm.
(b) A solution was made up as per (a) and activated carbon (Sutcliffe Speakman 207CP) was added to give a level, in suspension, of 1000 ppm.

The initial pH of both solutions was 7.2, and an iodine titration confirmed that the active THPS content of each solution was 3,750 ppm.

Both solutions were stirred, in contact with the air, for 24 hours. After this period, the solutions were analysed with the following results:

| Solution | pH | THPS (ppm) |
|---|---|---|
| (a) | 7.3 | 3,750 |
| (b) | 9.3 | Zero |

Bacterial tests were carried out on a sample of cooling water infected with bacteria at a level of $1.0 \times 10^4$ per ml.

Three 50 ml aliquots of the infected cooling water were taken. The first aliquot was used as a control. To the second aliquot was added 0.50 ml of solution (a). To the third aliquot was added 0.50 ml of solution (b).

The solutions were all incubated at 30° C. for 17 hours and the bacterial populations were then determined. The results were as follows:

| Solution | Bacteria per ml |
|---|---|
| blank | $6.0 \times 10^4$ |
| treated with (a) | $5.0 \times 10^2$ |
| treated with (b) | $1.0 \times 10^4$ |

Solution (a) retained its effectiveness as bactericide whereas solution (b) substantially lost its activity.

We claim:

1. A method of deactivating a solution comprising an organophosphorus biocide of formula $$[R^1R^2R^3R^4P^-]_yX^-]$$

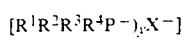

or $$R^1R^2R^3P$$

wherein $R^1$, $R^2$, $R^3$ and $R^4$ each independently represent a $C_{1-24}$ hydroxyalkyl, alkyl or alkenyl group, provided that at least one hydroxyalkyl group is present, and X is an anion of valency y, said solution containing dissolved oxygen, which comprises contacting said solution with a catalytic amount of a catalyst comprising activated carbon.

2. The method according to claim 1, wherein the activated carbon is in powdered or granular form.

3. The method according to claim 2, wherein the activated carbon has a size of >80% of less than 200 US mesh and has a specific surface area of 300 to 2,500 $m^2/g$.

4. The method according to claim 1, wherein said solution has a pH of 7–10.

5. The method according to claim 1, wherein the biocide molecule contains no more than one alkyl or alkenyl group.

6. The method according to claim 1, wherein each hydroxyalkyl group is a 1-hydroxyalkyl group.

7. The method according to claim 6, wherein each hydroxyalkyl group is a hydroxymethyl group.

8. The method according to claim 1, wherein each alkyl or alkenyl group contains 1 to 3 carbon atoms.

9. The method according to claim 8, wherein each alkyl group is selected from the group consisting of methyl and ethyl and each alkenyl group is allyl.

10. The method according to claim 1, wherein the biocide is selected from the group consisting of tetrakis (hydroxymethyl) phosphonium, methyltris(hydroxymethyl) phosphonium, ethyl tris(hydroxymethyl) phosphonium and allyl tris(hydroxymethyl) phosphonium salt.

11. The method according to claim 1, which further comprises the step of reactivating resultant spent catalyst after said contacting and said catalyst in said contacting is reactivated catalyst.

12. The method according to claim 1, wherein the anion is selected from the group consisting of a chloride, a bromide, an alkane carboxylate of 2 to 5 carbon atoms, a bisulfite, a bisulphate, an organic sulfonate, a dihydrogen phosphate, a sulphate, a sulfite, a monohydrogen phosphate, a phosphonate, an organic dicarboxylate, an organic carboxylate with three carboxyl groups, polyacrylate and polymaleate.

13. The method according to claim 1, wherein the anion is selected from the group consisting of acetate, methanesulphonate, benzene sulphonate, toluene sulphonate, xylene sulphonate and citrate.

14. The method according to claim 1, wherein the activated carbon is in an amount such that a weight ratio of said activated carbon to said biocide is 200:1 to 1:500.

15. The method according to claim 1, wherein the contacting comprises passing said solution through a bed containing said catalyst.

16. The method according to claim 15, wherein the contacting occurs for a period of 20 minutes to 30 hours.

17. The method according to claim 16, wherein said biocide is tetrakis(hydroxymethyl)phosphonium sulphate.

18. A method of deodorizing a solution comprising an organophosphorus biocide of formula $$[R^1R^2R^3R^4P^-]_yX^-]$$

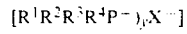

or $R^1R^2R^3P$ wherein $R^1$, $R^2$, $R^3$ and $R^4$ each independently represent a $C_{1-24}$ hydroxyalkyl, alkyl or alkenyl group, provided that at least one hydroxyalkyl group is present, and X is an anion of valency y, which comprises contacting said solution with an effective deodorizing amount of activated carbon.

19. The method according to claim 18, wherein the contacting comprises passing said solution through a bed containing said catalyst.

20. The method according to claim 19, wherein said biocide is tetrakis(hydroxymethyl)phosphonium sulphate.

* * * * *